United States Patent
Matsumoto

(10) Patent No.: US 11,584,166 B2
(45) Date of Patent: Feb. 21, 2023

(54) TYRE

(71) Applicant: Sumitomo Rubber Industries, Ltd., Hyogo (JP)

(72) Inventor: Tadao Matsumoto, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 355 days.

(21) Appl. No.: 16/896,058

(22) Filed: Jun. 8, 2020

(65) Prior Publication Data

US 2021/0001669 A1 Jan. 7, 2021

(30) Foreign Application Priority Data

Jul. 5, 2019 (JP) .............................. JP2019-126357

(51) Int. Cl.
*B60C 11/13* (2006.01)
*B60C 11/03* (2006.01)

(52) U.S. Cl.
CPC ...... *B60C 11/1307* (2013.01); *B60C 11/1315* (2013.01); *B60C 2011/0339* (2013.01); *B60C 2011/1338* (2013.01)

(58) Field of Classification Search
CPC ............ B60C 11/1307; B60C 11/1353; B60C 11/1369; B60C 11/0309; B60C 2011/1338
See application file for complete search history.

(56) References Cited

U.S. PATENT DOCUMENTS

| 6,415,835 B1 * | 7/2002 | Heinen | B60C 11/13 |
| | | | 152/209.21 |
| 2001/0032691 A1 * | 10/2001 | Ohsawa | B60C 11/13 |
| | | | 152/209.18 |
| 2010/0263775 A1 * | 10/2010 | Watanabe | B60C 11/0304 |
| | | | 152/209.8 |

FOREIGN PATENT DOCUMENTS

| JP | 2002-036820 | * | 3/2002 |
| JP | 2006044368 | * | 2/2006 |
| JP | 2006-341817 | * | 12/2006 |
| JP | 2013-169887 A | | 9/2013 |

OTHER PUBLICATIONS

English machine translation of JP 2002-036820. (Year: 2002).*
English machine translation of JP2006-341817. (Year: 2006).*

* cited by examiner

*Primary Examiner* — Robert C Dye
(74) *Attorney, Agent, or Firm* — Studebaker & Brackett PC

(57) ABSTRACT

A tyre includes a tread portion being provided with at least one main groove extending in a tyre circumferential direction and at least one lateral groove connected to the at least one main groove. The at least one main groove includes an intersection to which the lateral groove is connected. One of groove walls of the at least one main groove or the at least one lateral groove is provided with projections protruding toward the intersection.

17 Claims, 9 Drawing Sheets

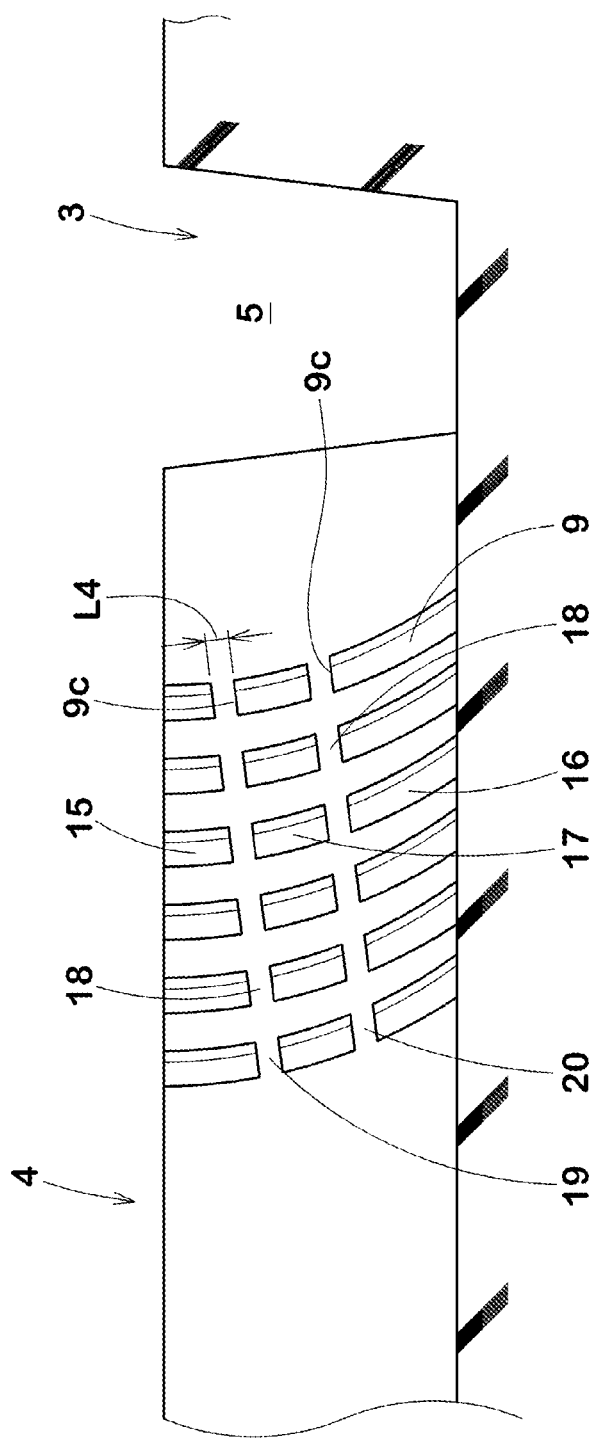

TYRE

BACKGROUND ART

Field of the Disclosure

The present disclosure relates to tyres.

Description of the Related Art

The following Patent Document 1 discloses a tyre including a tread portion which is provided with a circumferential groove extending in a tyre circumferential direction. The circumferential groove includes a pair of groove walls with a plurality of projections which protrudes in a tread-width direction and which is spaced in the tyre circumferential direction.

PATENT DOCUMENT

[Patent Document 1]
Japanese Unexamined Patent Application Publication 2013-169887

SUMMARY OF THE DISCLOSURE

Unfortunately, the tyre disclosed in Patent Document 1 has still room for improvement in removing stones that have entered the circumferential groove.

The present disclosure has been made in view of the above situation and has a main object to provide a tyre that can easily remove stones trapped in main grooves or lateral grooves.

According to one aspect of the present disclosure, a tyre includes a tread portion being provided with at least one main groove extending in a tyre circumferential direction and at least one lateral groove connected to the at least one main groove, the at least one main groove including an intersection to which the lateral groove is connected, and one of groove walls of the at least one main groove or the at least one lateral groove being provided with projections protruding toward the intersection.

In another aspect of the present disclosure, each of the projections, in a cross-section parallel to a ground contact surface of the tread portion, may have a top portion located farthest from the one of the groove walls and a base portion connected to the one of the groove walls, and the top portion may be located on the intersection side with respect to a center position of the base portion in a direction parallel to the one of the groove walls.

In another aspect of the present disclosure, each of the projections, in a cross-section parallel to a ground contact surface of the tread portion, may include a triangular shape portion having the top portion as one of vertex of the triangular shape portion.

In another aspect of the present disclosure, each of the projections may have a height from the one of the groove walls in a range from 10% to 30% of a groove width of the at least one main groove or the lateral groove on which the projection is provided.

In another aspect of the present disclosure, each of the projections, in a front view of the one of the groove walls, may extend in a tyre radial direction.

In another aspect of the present disclosure, each of the projections, in a front view of the one of the groove walls, may be inclined at an angle with respect to the tyre radial direction.

In another aspect of the present disclosure, each of the projections, in a front view of the one of the groove walls, may extend inwardly in the tyre radial direction toward the intersection.

In another aspect of the present disclosure, each of the projections, in a front view of the one of the groove walls, may be curved in an arc shape manner.

In another aspect of the present disclosure, each of the projections may have a length in the tyre radial direction equal to or more than 60% of a length of the one of the groove walls in the tyre radial direction.

In another aspect of the present disclosure, the projections may include one or more outer projections and one or more inner projections located inwardly of the outer projections in the tyre radial direction.

In another aspect of the present disclosure, the projections may be spaced in a longitudinal direction of the at least one main groove or the at least one lateral groove.

In another aspect of the present disclosure, the projections may be arranged in a constant pitch in the longitudinal direction.

In another aspect of the present disclosure, each of the at least one main groove and the at least one lateral groove may have a pair of groove walls, and the projections may be provided on both of the pair of groove walls of the at least one main groove or the at least one lateral groove.

In another aspect of the present disclosure, the projections may be arranged in such a manner that the respective projections provided on the pair of groove walls face with one another.

In another aspect of the present disclosure, the at least one lateral groove may include an increasing portion in which a groove width thereof increases toward the at least one main groove continuously, the increasing portion may be connected to the at least one main groove, and at least one of groove walls of the increasing portion may be provided with the projections.

BRIEF DESCRIPTION OF THE DRAWINGS

FIG. 7 is a front view of a groove wall for explaining projections according to yet another embodiment;

DESCRIPTION OF THE PREFERRED EMBODIMENTS

An embodiment of the present disclosure will be explained below with reference to the accompanying drawings.

Figure 1:
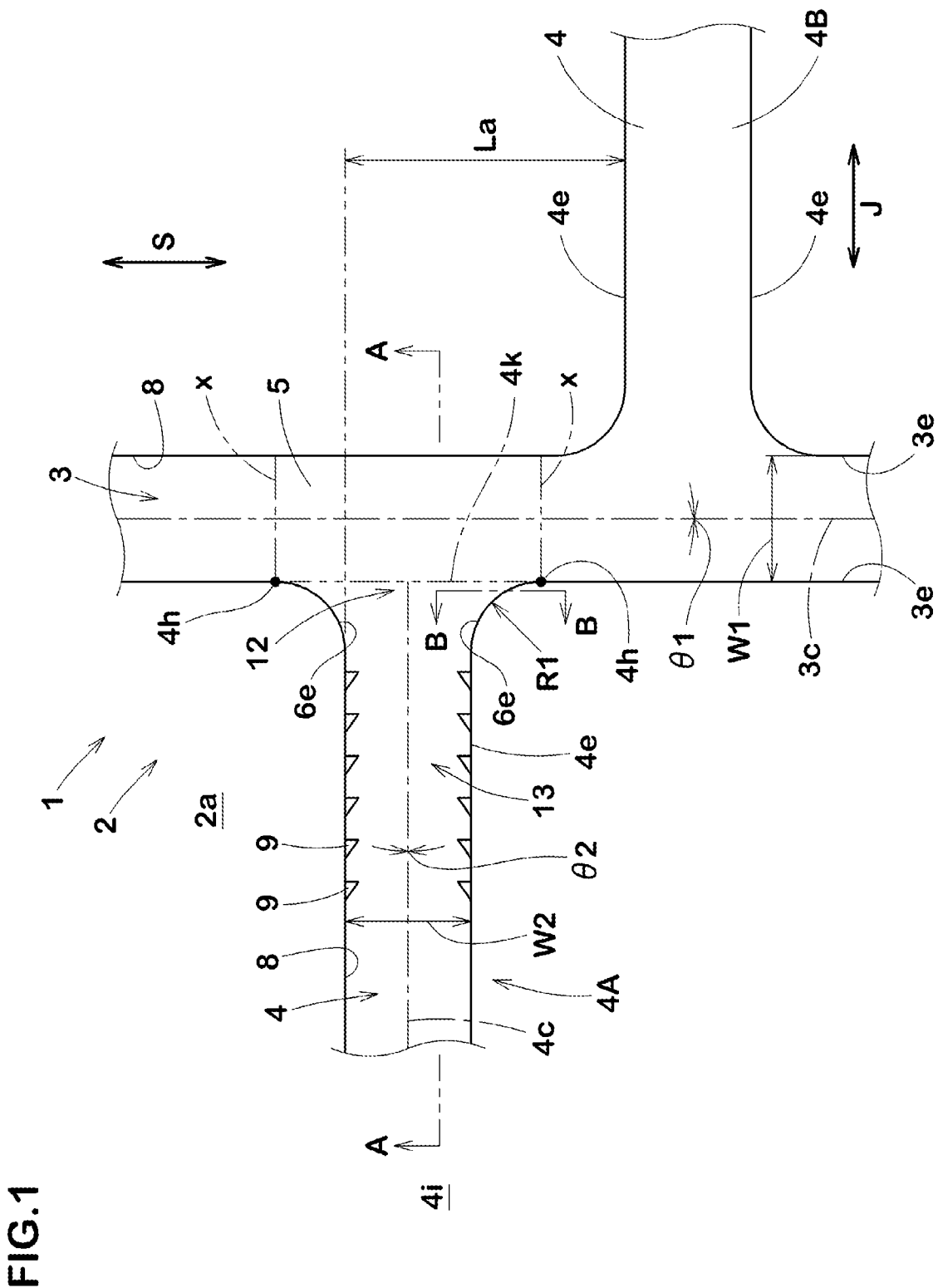
FIG. 1 is a plan view of a ground contact surface of a tread portion of a tyre according to an embodiment.

FIG. 1 is a plan view of a ground contact surface 2a of a tread portion 2 of a tyre 1 according to an embodiment of the disclosure.

The present disclosure can be embodied as various categories of tyres 1 such as pneumatic tyres for passenger car, motorcycle, heavy-duty vehicle and the like. In addition, the tyre 1 can be embodied as a non-pneumatic tyre which can structurally support the tyre load without being inflated with a compressed air, for example. The tyre 1 according to the present embodiment is embodied as a tyre for light truck.

The tread portion 2 according to the embodiment is provided with at least one main groove 3 extending in the tyre circumferential direction and at least one lateral groove 4 connected to the main groove 3. In FIG. 1, the vertical direction indicated by arrow S corresponds to the tyre circumferential direction, and the left and right direction indicated by arrow J corresponds to the tyre axial direction.

The main groove 3 includes an intersection 5 to which the lateral groove 4 is connected. As used herein, the intersection 5 is defined as a region of the main groove 3 sandwiched between two tyre axial lines x that extend from both ends 4h of an opening end of the lateral groove 4 at the main groove 3.

Figure 2:
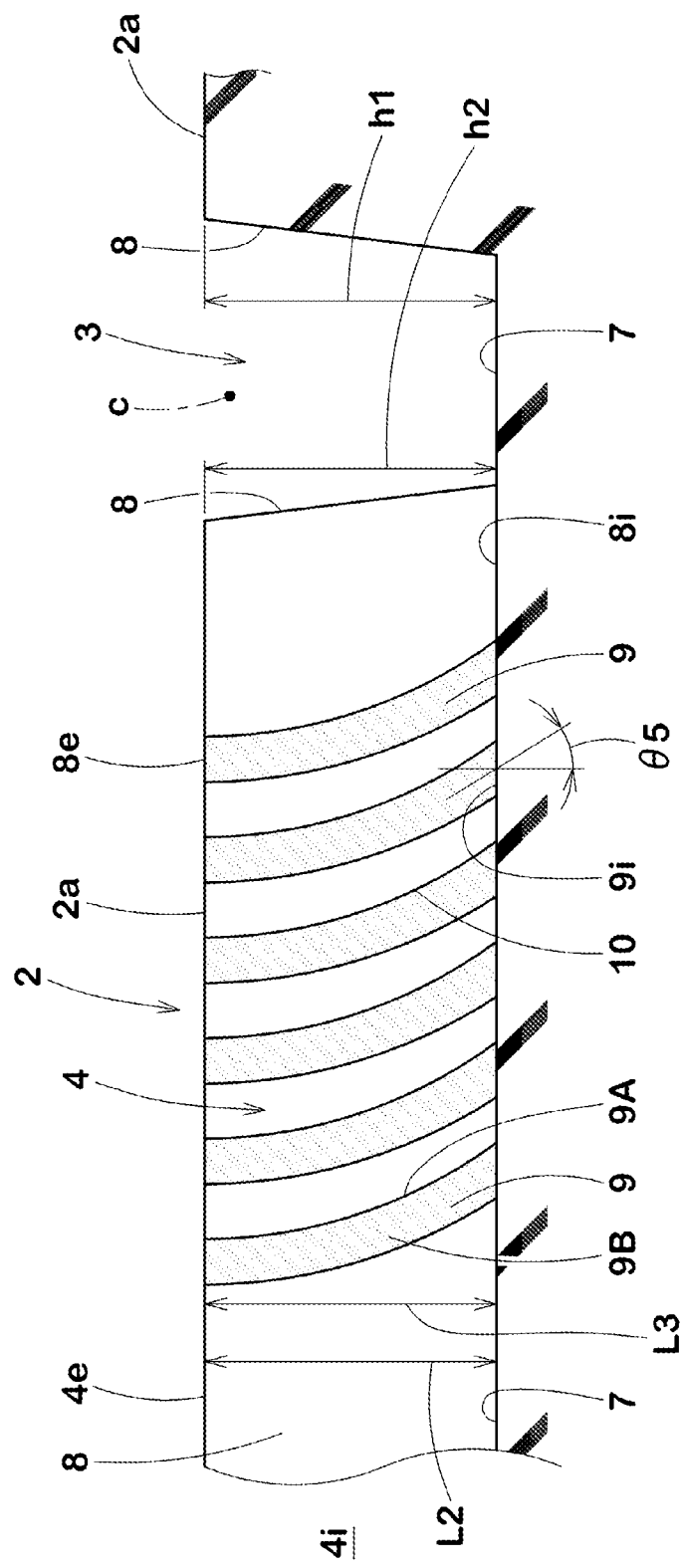
FIG. 2 is a cross-sectional view taken along lines A-A of FIG. 1.

FIG. 2 is a cross-sectional view taken along lines A-A of FIG. 1. As illustrated in FIG. 2, each of the main groove 3 and the lateral groove 4, in the present embodiment, includes a groove bottom 7 constituting a maximum depth position and a pair of groove walls 8 extending from the groove bottom 7 to a ground contact surface 2a of the tread portion 2. The groove centerlines 3c and 4c shown in FIG. 1 are located between the pair of groove walls 8 of the respective grooves 3 and 4. FIG. 2 corresponds to a front view of one of the groove walls 8.

As illustrated in FIG. 1 and FIG. 2, the groove walls 8 of the main groove 3 or the lateral groove 4 are provided with a plurality of projections 9 protruding toward the intersection 5. In such a tyre 1, when a stone is trapped in the main groove 3 or the lateral groove 4, the deformation of the main groove 3 or the lateral groove 4 due to rolling of the tyre 1 as well as the projections 9 can move the stone toward the intersection 5. Since the intersection 5 has less force to pinch the stone than other portion of the main groove 3 and the lateral groove 4, the stone guided to the intersection 5 can easily be removed. Further, when a trapped stone is located closer to the intersection 5 than some projections 9, these projections 9 restrain the stone from moving to the opposite side of the intersection 5 (the other end 4i side of the lateral groove 4). Thus, the tyre 1 of the present embodiment can exhibit high stone trapping resistance.

The projections 9, in the present embodiment, are provided on the pair of groove walls 8 of the lateral groove 4. The lateral groove 4, which extends in the tyre axial direction, is more difficult for the trapped stone to move and remove than the main groove 3, which extends in the tyre circumferential direction. Thus, by providing the projections 9 at least in the lateral groove 4, the stone trapping resistance can greatly be improved.

The main groove 3, for example, may extend continuously in the tyre circumferential direction or may extend such that both ends thereof (not illustrated) in the tyre circumferential direction are terminated within a land portion of the tread portion 2. It is not limited but a length in the tyre circumferential direction of the main groove 3 may be preferably equal to or more than 80% of a tread width (not illustrated).

The "tread width" shall mean an axial distance between tread edges (not illustrated) that are the axial outermost edges of the ground contacting patch of the tyre 1 which occurs under a normal condition with a standard tyre load when the camber angle of the tyre is zero. The "normal condition" is such that the tyre 1 is mounted onto a standard wheel rim (not illustrated) with a standard pressure but loaded with no tyre load. As used herein, unless otherwise noted, dimensions of portions of the tyre 1 are values measured under the normal condition.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The "standard tyre load" is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

Further, the main groove 3 may extend in parallel with the tyre circumferential direction, or may be inclined at an angle with respect to the tyre circumferential direction. It is not limited but an angle θ1 of the main groove 3 may be equal to or less than 10 degrees with respect to the tyre circumferential direction.

Further, the main groove 3 may extend in a straight manner, zigzag manner or wavy manner. A groove width W1 of the main groove 3 is preferably in a range from 6 to 12 mm, for example. Also, a groove depth h1 of the main groove 3 is preferably in a range from 7 to 14 mm, for example.

The lateral groove 4 according to the present embodiment includes an increasing portion 12 in which a groove width thereof increases toward the main groove 3 continuously. The increasing portion 12, for example, is connected to the main groove 3. Since the increasing portion 12 has a small force to pinch a stone, it helps to remove the trapped stone from the lateral groove 4 easily. In the present embodiment, the lateral groove 4 includes the increasing portion 12 and a constant width portion 13 that is continuous with the increasing portion 12 and has a constant groove width W2. Note that the lateral groove 4 is not limited to such an aspect but may be formed by only the constant width portion 13, for example.

In the present embodiment, the increasing portion 12 includes a pair of groove edges 6e, and the pair of groove edges 6e is formed in an arc shape manner that is smoothly connected to groove edges 3e of the main groove 3. Each of the groove edges, in the present embodiment, is the edge where a respective groove wall 8 and the ground contact surface 2a intersect with one another. The increasing portion 12 can reduce flow resistance of water in the main groove 3 and the lateral groove 4. In addition, the increasing portion 12 can smoothly move a stone trapped in the lateral groove 4 to the intersection 5 side. In the present embodiment, the increasing portion 12 includes the pair of groove edges 6e being formed in an arc shape manner. It is not particularly limited but a radius of curvature R1 of the pair of groove edges 6e of the increasing portion 12 may be in a range from 5 to 20 mm, for example. Note that the pair of groove edges 6e is not limited to an arc shape but may be a straight shape, for example.

Figure 3:
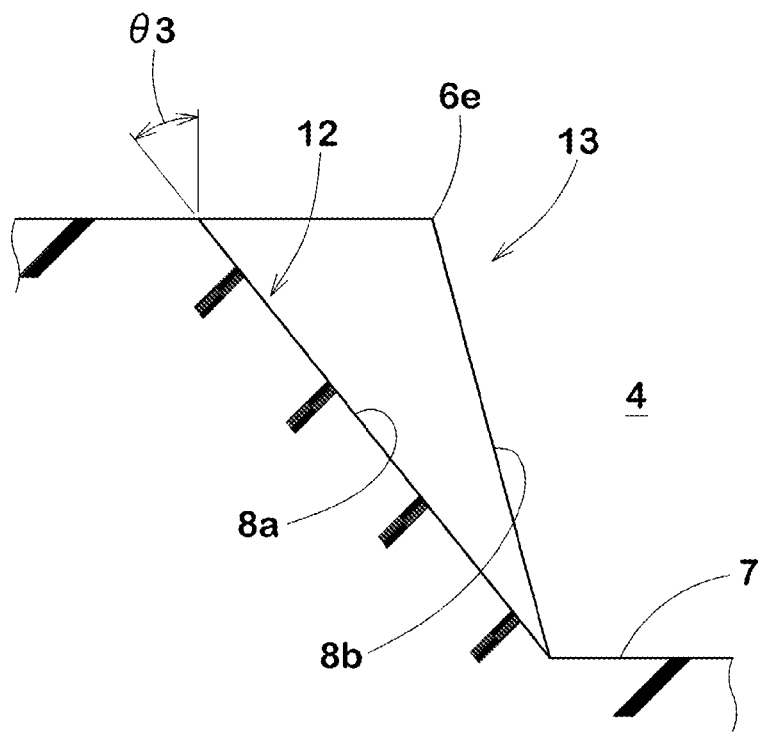
FIG. 3 is a cross-sectional view taken along line B-B of FIG. 1.

FIG. 3 is a cross-sectional view taken along line B-B of FIG. 1. As illustrated in FIG. 3, the increasing portion 12 of the present embodiment includes a first groove wall portion 8a on the main groove 3 side and a second groove wall portion 8b on the constant width portion 13 side. An angle θ3 of the first groove wall portion with respect to the tyre radial direction is greater than that of the second groove wall portion 8b. Such an increasing portion 12 makes it easier to move a stone trapped in the lateral groove 4 to the intersection 5.

The at least one lateral groove 4, in the present embodiment, may include at least one first lateral groove 4A which is connected to the main groove 3 on a first side in the tyre axial direction (left side in FIG. 1), and at least one second lateral groove 4B connected to the main groove 3 on a second side in the tyre axial direction (right side in FIG. 1).

The first lateral groove 4A and the second lateral groove 4B have their groove edges 4e and 4e misaligned in the tyre circumferential direction from one another. As a result, a stone moved from the first lateral groove 4A is prevented from being trapped in the second lateral groove 4B beyond the main groove 3. Preferably, a distance La in the tyre circumferential direction between the first lateral groove 4A and the second lateral groove 4B is greater than the groove width W2 of the first lateral groove 4A (e.g., a groove width at the constant width portion 13) or the second lateral groove 4B (e.g., a groove width at the constant width portion 13). More preferably, the distance La is more than twice the groove width W2 of the first lateral groove 4A or more than twice the groove width W2 of the second lateral groove 4B.

Further, the lateral groove 4 may include first lateral grooves 4A and second lateral grooves 4B which are alternated in the tyre circumferential direction.

The at least one lateral groove 4 may extend in parallel with the tyre axial direction or may be inclined at an angle θ2 with respect to the tyre axial direction. It is not particularly limited but the angle θ2 of lateral groove 4 is preferably equal to or less than 20 degrees with respect to the tyre axial direction.

Further, the lateral groove 4, for example, may have another end which is connected to another main groove. Alternatively, the lateral groove 4 may have another end which is terminated within a land portion without reaching another main groove or which is connected to one of the tread edges.

Furthermore, the lateral groove 4 may extend in a straight manner, zigzag manner or wavy manner. It is not particularly limited but the groove width W2 of the lateral groove 4 (i.e., a groove width of the constant width portion 13) is in a range from 6 to 12 mm, for example. Also, a groove depth h2 of the lateral groove 4 is preferably in a range from 7 to 14 mm, for example.

Figure 4:
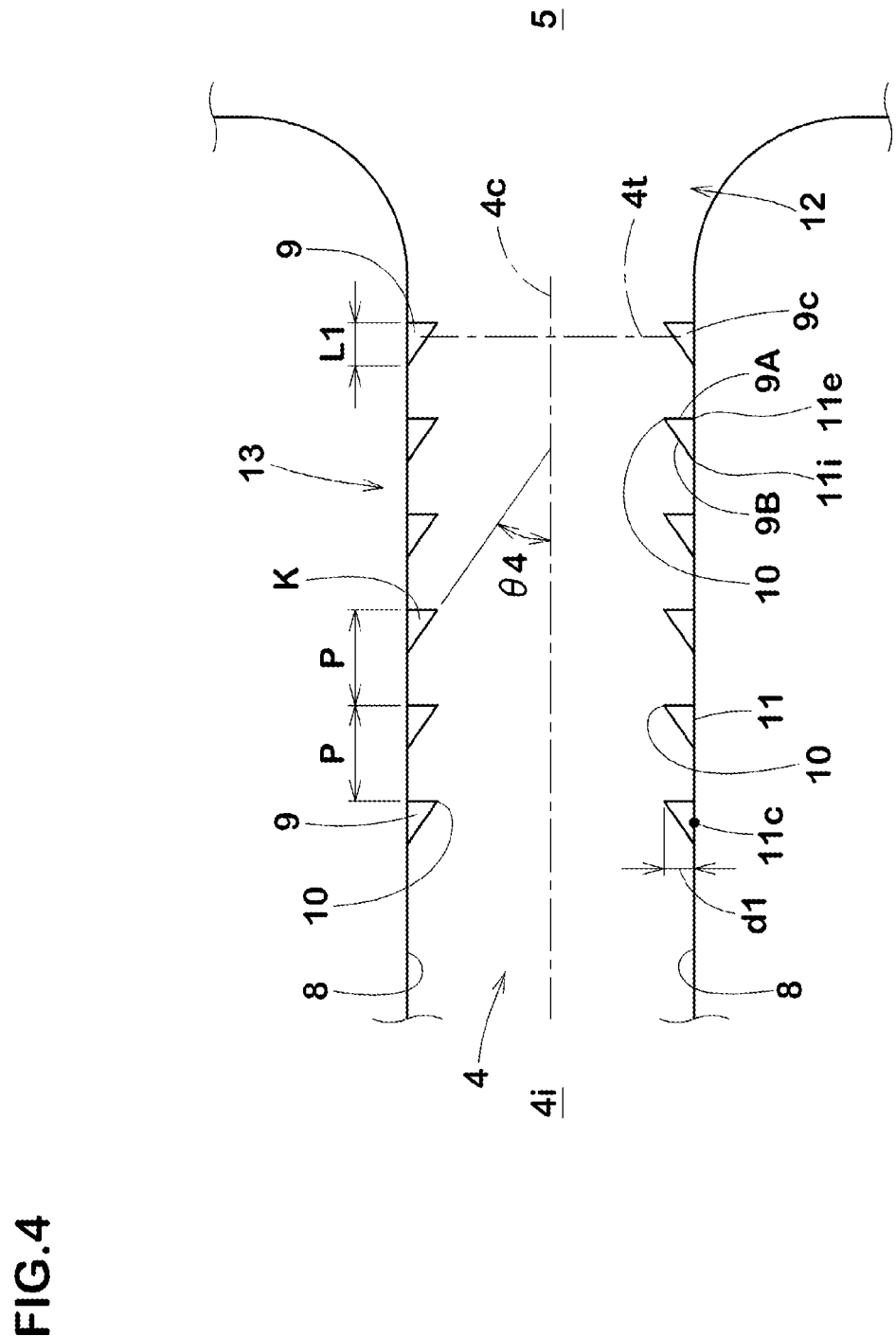
FIG. 4 is a partial enlarged view of a lateral groove of FIG. 1.

FIG. 4 is a partial enlarged view of the lateral groove 4 in FIG. 1. As illustrated in FIG. 4, the projections 9 according to the present embodiment are provided on both groove walls 8 and 8 of the lateral groove 4. As a result, when a stone is trapped in the lateral groove 4 on the intersection 5 side than some projections 9, the stone is prevented from moving to the opposite side of the intersection 5, and thus the stone is smoothly moved to the intersection 5. The projections 9 may be provided on either one of the groove walls 8.

In the present embodiment, the projections 9 are provided on only the constant width portion 13, and are not provided on the increasing portion 12. A stone trapped in the constant width portion 13 can move to both sides of the lateral groove 4 in the longitudinal direction. Thus, by providing the projections 9 at least in the constant width portion 13, it is possible to suppress the movement of the stone toward the other end 4i side of the lateral groove 4 and to promote the movement of stone toward the intersection 5 side, thereby improving stone trapping resistance greatly.

In the present embodiment, each of the projections, in a cross-section parallel to the ground contact surface 2a of the tread portion 2, has a top portion 10 situated farthest from the groove walls 8 and a base portion 11 connected to the groove walls 8.

The top portion 10, in the present embodiment, is located on the intersection 5 side with respect to the center position 11c of the base portion 11 in the groove centerline 4c direction of the lateral groove 4. The projections 9 each having such a top portion 10 can enhance the action of moving a stone trapped in the lateral groove 4 to the intersection 5. In addition, the projections 9 can suppress the movement of stones toward the other end 4i of the lateral groove 4. Note that the center position 11c of the base portion 11 is the midpoint of the line segment across the base portion 11 along the groove centerline 4c of the lateral groove 4.

Each of the projections 9, in the present embodiment, includes a triangular shape portion K having the top portion 10 as one of vertex of the triangular shape portion. Each projection 9 according to the present embodiment is formed only by the triangular shape portion K. Such a projection 9 can reduce drainage resistance of the lateral groove 4 and improve drainage performance. In the present embodiment, each projection 9 includes a first surface 9A extending from the top portion 10 to one end 11e of the base portion 11 located on the intersection 5 side, and a second surface 9B extending from the top portion 10 to the other end 11i of the base portion 11 located on the opposite side of the intersection 5. Each projection 9 further includes a radially outer surface 9c defined between an outer edge in the tyre radial direction of the first surface 9A and an outer edge in the tyre radial direction of the second surface 9B.

In the present embodiment, the first surface 9A extends in a direction perpendicular to the groove centerline 4c. The first surface 9A, for example, may be inclined in a direction toward the intersection 5 while extending toward the groove centerline 4c or may be inclined in a direction toward the opposite to the intersection 5 while extending toward the groove centerline 4c. In the present embodiment, the second surface 9B is inclined in a direction toward the intersection 5 while extending toward the groove centerline 4c.

In the present embodiment, the projections 9 are arranged in such a manner that the respective projections 9 provided on the pair of groove walls 8 face with one another. As a result, the above-mentioned advantageous action can effectively be exhibited. Note that "two projections 9 face with one another" shall mean that the outer surfaces 9c of the two projections 9 are located on a common virtual line 4t orthogonal to the groove centerline 4c.

Preferably, each of the projections 9 has a height d1 from the groove wall 8 in a range from 10% to 30% of the groove width W2 of the lateral groove 4 on which the projection 9 is provided. As a result, stone trapping resistance and drainage performance are enhanced in a well-balanced manner. Preferably, the height d1 of each projection 9, for example, is in a range from about 1 to 2.5 mm. It is not particularly limited but a length L1 of each projection 9 measured along the groove centerline 4c is in a range from 100% to 200% of the height d1.

The projections 9 are spaced in the longitudinal direction of the lateral groove 4. As a result, a stone trapped in the lateral groove 4 can move to the intersection 5 side in sequence, so that stone trapping resistance can further be improved.

The projections 9 are arranged in a constant pitch P in the longitudinal direction of the lateral groove 4. Such projections 9 can keep resistance of water flowing in the lateral groove 4 small and suppress deterioration of drainage performance of the tyre. It is not particularly limited but the pitch P is preferably in a range from 10% to 30% of the groove width W2 of the lateral groove 4, for example. Alternatively, the pitch P may increase toward the intersection 5 or may decrease toward the intersection 5.

Preferably, an angle θ4 of each projection 9 is in a range from 10 to 50 degrees with respect to the groove centerline 4c in order to further improve stone trapping resistance. In the present embodiment, the angle θ4 of each projection 9 is an angle of the second surface 9B with respect to the groove centerline 4c.

As illustrated in FIG. 2, each projection 9, for example, extends in the tyre radial direction. Such a projection 9 can prevent a stone trapped in the lateral groove 4 from being deeply in the groove bottom 7 side.

In the present embodiment, the projections 9 are inclined with respect to the tyre radial direction. Such projections 9 further suppress the progress of a trapped stone toward the groove bottom 7 side. Furthermore, since the projections 9 disperse the pressing force of the stone in the longitudinal direction of the lateral groove 4, even if the stone contacts the groove bottom 7, damage to the groove bottom 7 can be suppressed.

Each of the projections 9, in a front view of the groove wall 8, extends inwardly in the tyre radial direction toward the intersection 5. Such a projection 9 can promote the movement of a trapped stone toward the intersection 5 side while suppressing the progress of the stone toward the groove bottom 7 side, thus improving stone trapping resistance further.

In the present embodiment, each of the projections 9, in a front view of the groove wall 8, is curved in an arc shape manner. Since such a projection 9 can exhibit relatively large rigidity, damage to each projection 9 such as crack and chipping due to contact with a trapped stone can be suppressed while further suppressing the progress of the stone to the groove bottom 7.

Each projection 9, for example, is formed in an arc shape with a center (c) located on the intersection 5 side in the longitudinal direction of the lateral groove 4. In other words, each projection 9 is formed in a convex arc shape protruding toward the other end 4i side of the lateral groove 4. Such a projection 9 can further prevent a trapped stone from touching the groove bottom 7. Alternatively, one or more projections 9 may be formed in an arc shape having a center on the other end 4i side of the lateral groove 4 with respect to the projections 9 (not illustrated). Such projections 9 can also prevent stones from being trapped.

Preferably, an angle θ5 of each projection 9 at an inner end 9i thereof in the tyre radial direction is in a range from 20 to 40 degrees with respect to the tyre radial direction in order to reduce the pressing force of the trapped stone to the groove bottom 7 while reducing drainage resistance.

Preferably, each of the projections 9 has a length L2 in the tyre radial direction equal to or more than 60% of a length L3 of the groove wall 8 in the tyre radial direction. This can effectively suppress the contact of a trapped stones with the groove bottom 7. Each projection 9, for example, extends continuously from a radially outer edge 8e (i.e., groove edge 4e) of the groove wall 8 to a radially inner edge 8i (i.e., the groove bottom 7) of the groove wall 8.

Figure 5:
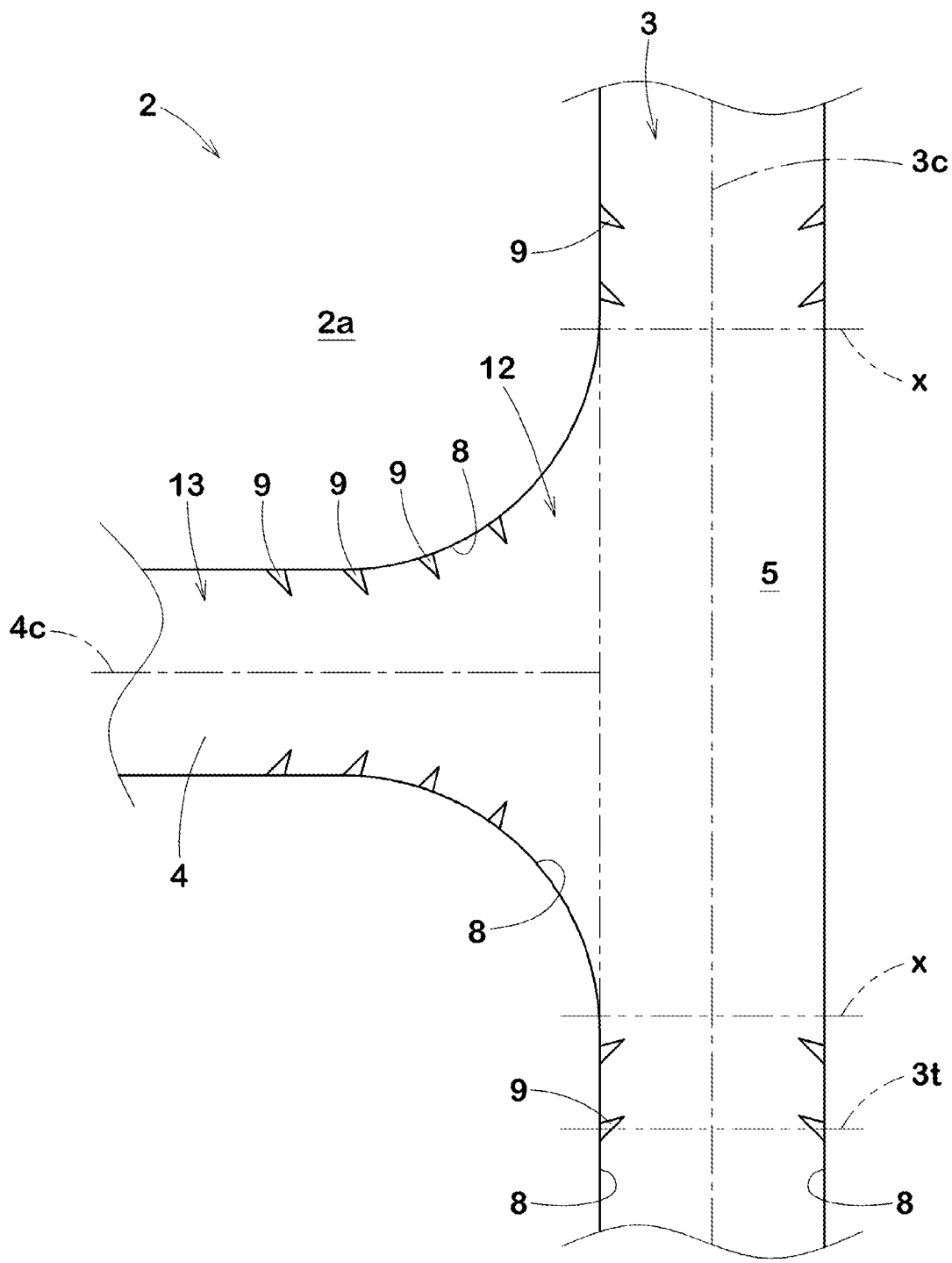
FIG. 5 is a plan view of the tread portion according to another embodiment.

FIG. 5 illustrates a plan view of another embodiment of the tread portion 2. Note that the same elements of the tread portion 2 described in the above embodiment are denoted by the same numeral references and that the explanation thereof are omitted. As illustrated in FIG. 5, the projections 9 are provided on the increasing portion 12 and the main groove 3. Thus, a stone trapped in the main groove 3 also can move to the intersection 5 side, improving stone trapping resistance further.

The projections 9 are provided on the pair of groove walls 8 of the increasing portion 12 and the pair of groove walls 8 of the main groove 3. These projections 9 provided on the main groove 3, for example, are arranged in such a manner that the respective projections 9 provided on the pair of groove walls 8 face with one another (i.e., two projections 9 are located on a common virtual line 3t orthogonal to the groove centerline 3c).

Figure 6:
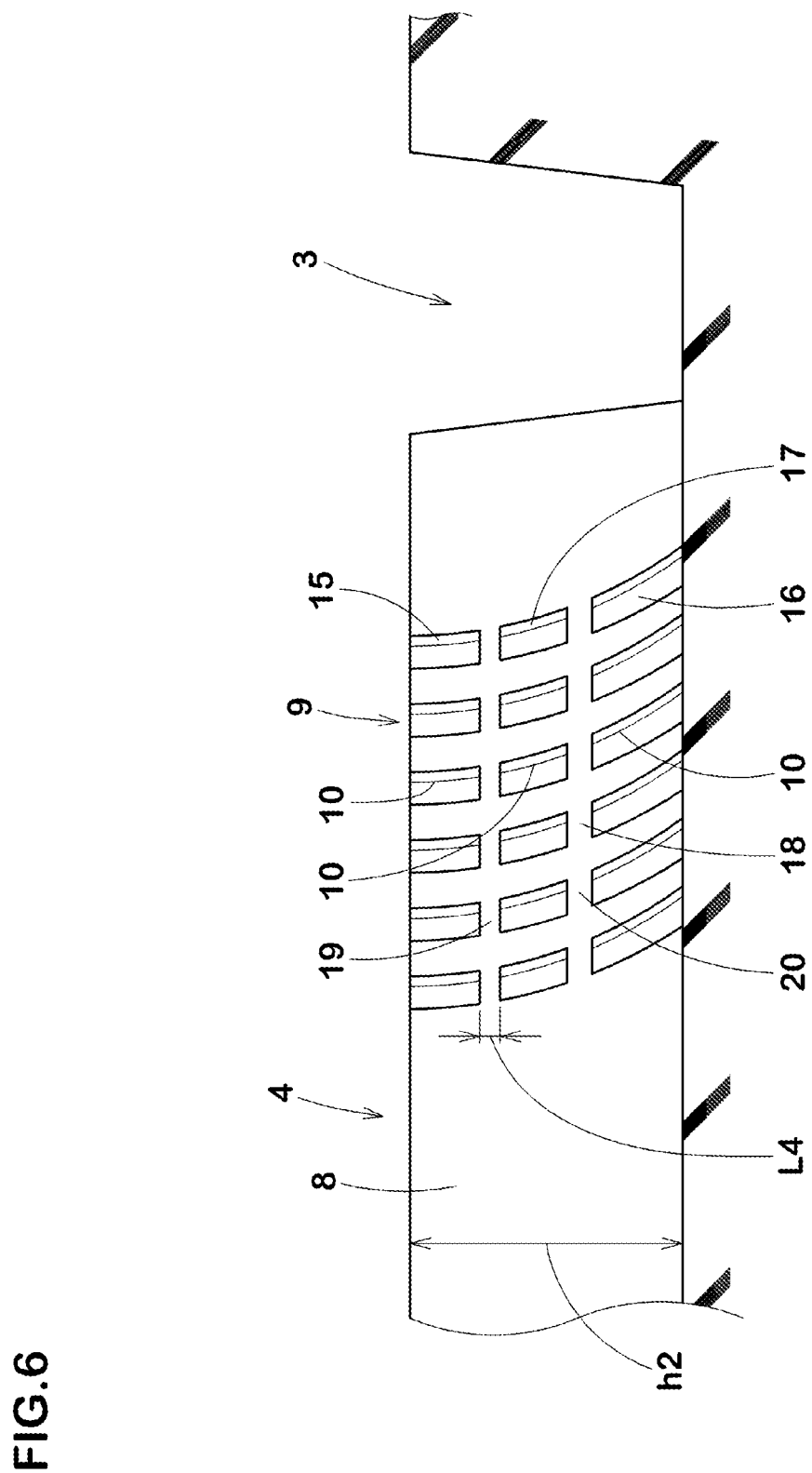
FIG. 6 is a front view of a groove wall for explaining projections according to another embodiment.

FIG. 6 is a front view of one of the groove walls of the lateral groove 4 according to yet another embodiment. Note that the same elements of the projections 9 described in the above embodiments are denoted by the same numeral references and that the explanation thereof are omitted. As illustrated in FIG. 6, the plurality of projections 9 according to this embodiment includes one or more outer projections 15 and one or more inner projections located 16 inwardly of the outer projections 15 in the tyre radial direction. The outer projections 15 and the inner projections 15 are spaced in the radial direction with gaps 18. The gaps 18 can help to reduce drainage resistance.

In this embodiment, the plurality of projections 9 further includes one or more middle projections 17 arranged between the outer projections 15 and the inner projections 16. Thus, the gaps 18 include outer gaps 19 located between the outer projections 15 and the middle projections 17, and inner gaps 19 located between the inner projections 16 and the middle projections 17.

Preferably, each set of one of the outer projections 15, one of the middle projections 17 and one of the inner projections 15 is arranged so as to form a single straight line or arc curve line. Note that "so as to form a single straight line or arc curve line" means that the top portions 10 of the set of projections 15 to 17 is arranged on a single straight line extending in the tyre radial direction or on a single arc curve without having an inflection point.

Preferably, lengths L4 in the tyre radial direction of the gaps 18 are in a range from 5% to 25% of the groove depth h2, for example. Thus, stone trapping resistance and drainage performance can be ensured in a well-balanced manner. Further, the lengths L4 of the gaps 18, for example, may preferably be in a range from 1 to 3 mm.

In this embodiment, the gaps 18 are arranged in the longitudinal direction of the lateral groove 4. Preferably, the gaps 18 arranged in the longitudinal direction are arranged in the same height in the tyre radial direction so that a straightly extending non-projection area is formed in the longitudinal direction. Such an aspect can keep resistance of the water flowing through the gap 18 small and enhance drainage performance of the tyre.

FIG. 7 is a front view of one of the groove walls of the lateral groove 4 according to yet another embodiment. Note that the same elements of the projections 9 described in the above embodiments are denoted by the same numeral references and that the explanation thereof are omitted. In this embodiment, the projections 9 are spaced in the longitudinal direction of the lateral groove 4 and include the outer projections 15, the inner projections 16 and the middle projections 17. In addition, the gaps 18 are formed between the outer projections 15 and the middle projections 17, and between the inner projections 16 and the middle projections 17.

The gaps 18 arranged in the longitudinal direction of the lateral groove 4 are displaced in the tyre radial direction from one another. Specifically, these gaps 18 are provided so as to be gradually displaced outward in the tyre radial direction toward the intersection 5 side. In this embodiment, a trapped stone in the lateral groove 4 may receive force directed outward in the tyre radial direction by the outer surfaces 9c of the inner projections 15 and the outer surfaces 9c of the middle projections 17. Thus, the trapped stone can be moved to the intersection 5 side while being moved to the outside of the tyre radial direction. Therefore, in this embodiment, the trapped stone can be discharged more easily. In this embodiment, each of the outer gap 19 and each of the inner gap 20 are displaced to the outside of the tyre radial direction toward the intersection 5 side. Note that only each of the outer gaps 19 may be displaced to the outside of the tyre radial direction toward the intersection 5 side. Alternatively, only each inner gap 20 may be displaced outside the tyre radial direction toward the intersection 5 side.

Figure 8A:
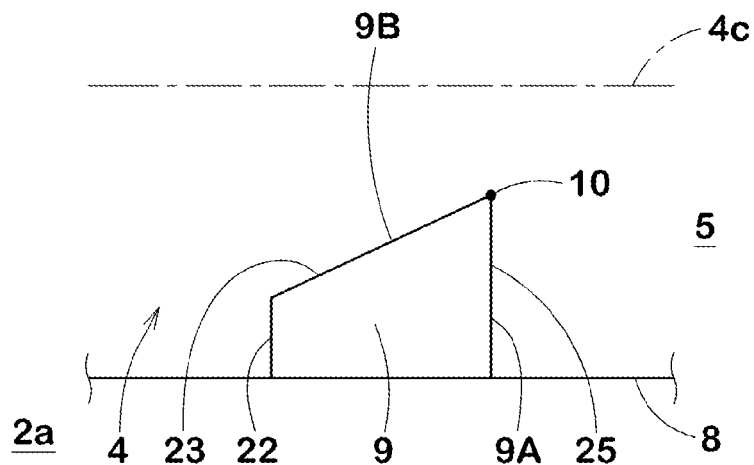
FIGS. 8A to 8C are plan views of projections according to yet another embodiment.
Figure 8B:
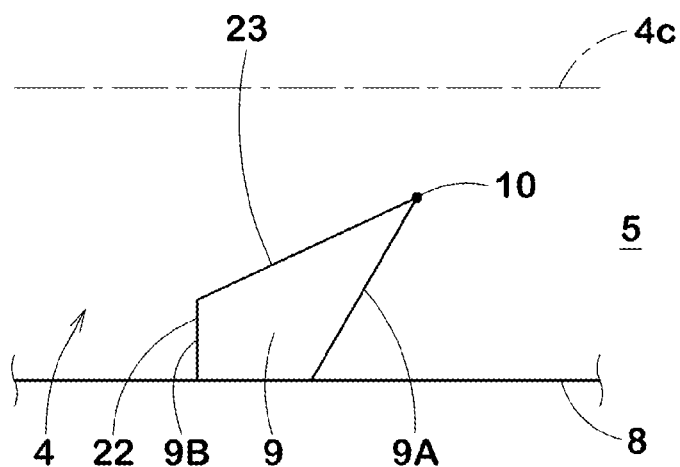
Figure 8C:
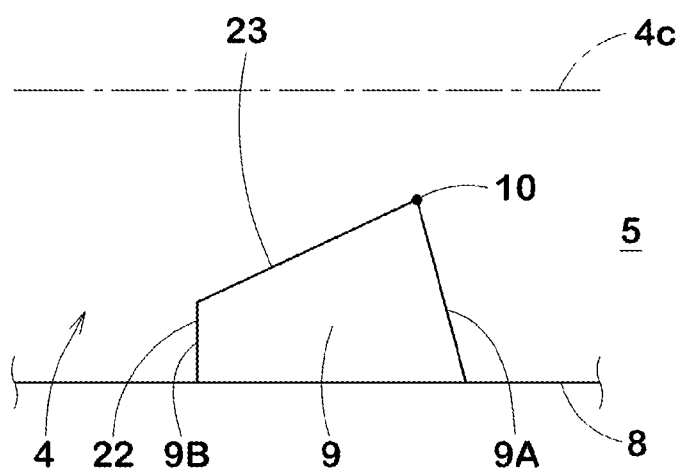

FIGS. 8A to 8C are plan views of projections 9 according to yet another embodiment. Note that the same elements of the projections 9 described in the above embodiments are denoted by the same numeral references and that the explanation thereof are omitted. As illustrated in FIG. 8A, the second surface 9B of the projection 9 is formed by a straight-line portion 22 extending in a direction orthogonal to the groove centerline 4c, and an inclined portion 23 extending from the end of the straight-line portion 22 toward the intersection 5 side. The first surface 9A of the projection 9 is formed by a straight part 25 extending in a direction orthogonal to the groove centerline 4c. The first surface 9A of the projection 9 may be inclined toward the intersection 5 side toward the groove centerline 4c side (shown in FIG. 8B). Alternatively, the first surface 9A of the projection 9 may be inclined toward the groove centerline 4c and opposite to the intersection 5 (shown in FIG. 8C).

Figure 9A:
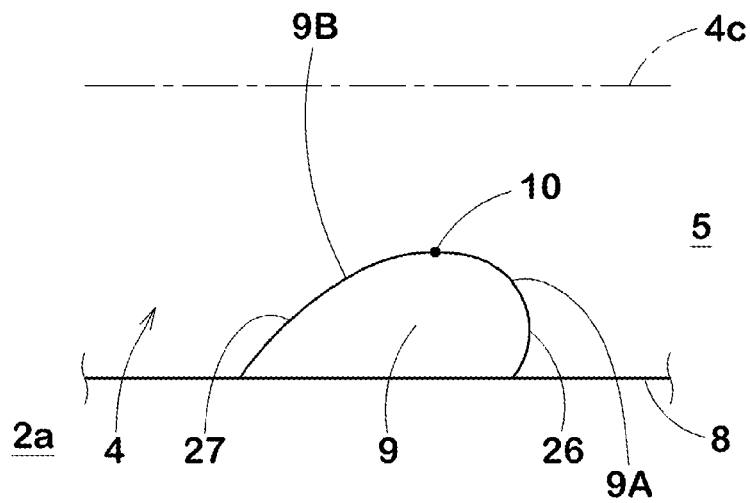
FIGS. 9A and 9B are plan views of projections according to yet another embodiment.
Figure 9B:
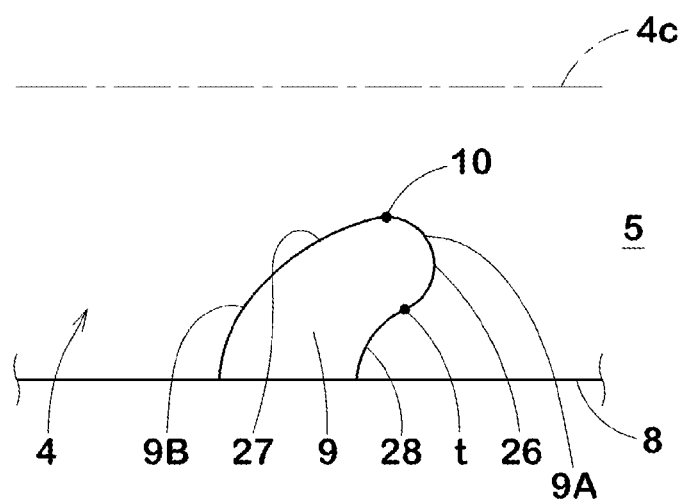

FIGS. 9A and 9B are plan views of projections 9 according to yet another embodiment. Note that the same elements of the projections 9 described in the above embodiments are denoted by the same numeral references and that the explanation thereof are omitted. As illustrated in FIG. 9A, the first surface 9A of the projection 9 is formed by a first arc portion 26 that is convex toward the groove centerline 4c, and the second surface 9B is formed by a second arc portion 27 having a larger radius of curvature than that of the first surface 9A. As illustrated in FIG. 9B, in the projections 9 of this embodiment, the first surface 9A may further include a third arc portion 28 that is continuous with the first arc portion 26 via the inflection point t.

While the particularly preferred embodiments in accordance with the disclosure have been described in detail above, the present disclosure is not limited to the above embodiments but can be modified and carried out in various aspects within the scope of the disclosure.

Example

Pneumatic tyres for light truck each of which has the basic pattern of the tread portion with the main groove and lateral groove shown in FIG. 1 were prototyped based on the specifications in Table 1. Then, each trial tyre was tested for stone trapping resistance and drainage performance. The tyres have the following common specifications.
tyre size: 205/85R16
rim size: 16×5.5J
inner pressure: 600 kPa
Stone Trapping Test:

Each trial tyre was installed on all wheels of a light truck having a displacement of 3,000 cc (2-D type) loaded with three ton. Then, after the vehicle was driven on a test road covered with gravel, state of the main groove and the lateral groove (stone trapping and damage to the groove bottoms) was evaluated by the tester's sensuality. The test results are shown in Table 1 using a score of 100 for the comparative example. The larger the numerical value, the smaller the stone trapping in each groove or the damage to the groove bottom, and the better.
Drainage Performance Test:

The truck was made to run on a wet pavement with a water depth of 10 mm and the speed at which the hydroplaning phenomenon occurred was measured. The test results are shown in Table 1 using an index with the comparative example being 100. The larger the number, the better.

Table 1 shows the test results. Note that in Table 1, "B" represents that the projections protrude toward the opposite side to the intersection, and "A" represents that the projections protrude toward the intersection side.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Protruding direction of projections | B | A | A | A | A | A | A | A | A | A |
| Groove width W2 of lateral groove (mm) | 9 | 9 | 9 | 9 | 9 | 9 | 9 | 9 | 9 | 9 |
| Groove width of main groove W1 (mm) | 9 | 9 | 9 | 9 | 9 | 9 | 9 | 9 | 9 | 9 |
| Distance La (mm) | 20 | 20 | 20 | 20 | 20 | 20 | 20 | 20 | 20 | 20 |
| Radius of curvature R1 (mm) | 10 | 10 | 5 | 20 | 10 | 10 | 10 | 10 | 10 | 10 |
| Heights d1 of projections (mm) | 2 | 2 | 2 | 2 | 4 | 0.5 | 2 | 2 | 2 | 2 |
| Angle θ4 of projections (deg.) | 30 | 30 | 30 | 30 | 30 | 30 | 30 | 30 | 30 | 30 |
| Depth h2 of lateral groove (mm) | 14 | 14 | 14 | 14 | 14 | 14 | 14 | 14 | 14 | 14 |

TABLE 1-continued

| | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Groove wall front view of lateral groove | FIG. 2 | FIG. 2 | FIG. 2 | FIG. 2 | FIG. 2 | FIG. 2 | FIG. 6 | FIG. 6 | FIG. 6 | FIG. 7 |
| Lengths of gaps L4 (mm) | — | — | — | — | — | — | 2 | 0.5 | 4 | 2 |
| Stone trapping resistance [score: larger is better] | 100 | 120 | 115 | 115 | 127 | 112 | 115 | 120 | 110 | 122 |
| Wet performance [index: larger is better] | 100 | 100 | 100 | 100 | 95 | 105 | 102 | 100 | 105 | 95 |

From the test results, it is confirmed that the tyres of the example exhibit superior to the comparative example.

What is claimed is:

1. A tyre comprising:
a tread portion being provided with at least one main groove extending in a tyre circumferential direction and at least one lateral groove connected to the at least one main groove, each of the main groove and the lateral groove having a groove bottom and a pair of groove walls extending from the groove bottom in a tyre radial direction,
the at least one main groove comprising an intersection to which the at least one lateral groove is connected, and
one of the groove walls of the at least one main groove or the at least one lateral groove being provided with projections protruding toward the intersection, wherein
each of the projections, in a front view of the one of the groove walls, is curved in an arc-shaped manner and extends from the groove bottom to a ground contact surface of the tread portion in the tyre radial direction and is inclined at an angle with respect to the tyre radial direction,
the angle decreases as the projection extends outward in the tyre radial direction, and
the angle is the same for each of the projections.

2. The tyre according to claim 1, wherein
each of the projections, in a cross-section parallel to a ground contact surface of the tread portion, has a top portion located farthest from the one of the groove walls and a base portion connected to the one of the groove walls, and
the top portion is located on the intersection side with respect to a center position of the base portion in a direction parallel to the one of the groove walls.

3. The tyre according to claim 2, wherein
each of the projections, in a cross-section parallel to a ground contact surface of the tread portion, comprises a triangular shape portion having the top portion as one of vertex of the triangular shape portion.

4. The tyre according to claim 2, wherein
each projection, in a cross-section parallel to a ground contact surface of the tread portion, comprises
a first surface extending from the top portion to one end of the base portion located on the intersection side and
a second surface extending from the top portion to the other end of the base portion located on the opposite side of the intersection, and
the first surface is shorter than the second surface.

5. The tyre according to claim 4, wherein
the first surface extends in a direction perpendicular to the direction parallel to the one of the groove walls.

6. The tyre according to claim 5, wherein
the second surface extends straight over its entire length.

7. The tyre according to claim 1, wherein
each projection has a height from the one of groove walls in a range from 10% to 30% of a groove width of the at least one main groove or the lateral groove on which the projection is provided.

8. The tyre according to claim 1, wherein
each of the projections, in a front view of the one of the groove walls, extends inwardly in the tyre radial direction toward the intersection.

9. The tyre according to claim 1, wherein
each of the projections has a length in the tyre radial direction equal to or more than 60% of a length of the one of the groove walls in the tyre radial direction.

10. The tyre according to claim 1, wherein
the projections comprise one or more outer projections and one or more inner projections located inwardly of the outer projections in the tyre radial direction.

11. The tyre according to claim 1, wherein
the projections are spaced in a longitudinal direction of the at least one main groove or the at least one lateral groove.

12. The tyre according to claim 11, wherein
the projections are arranged in a constant pitch in the longitudinal direction.

13. The tyre according to claim 1, wherein
the projections are provided on both of the pair of groove walls of the at least one main groove or the at least one lateral groove.

14. The tyre according to claim 13, wherein
the projections are arranged in such a manner that the respective projections provided on the pair of groove walls face with one another.

15. The tyre according to claim 1, wherein
the at least one lateral groove comprises an increasing portion in which a groove width thereof increases toward the at least one main groove continuously,
the increasing portion is connected to the at least one main groove, and
at least one of groove walls of the increasing portion is provided with the projections.

16. The tyre according to claim 1, wherein
each projection extends in an arc shape manner with a center of radius of curvature located on the intersection side.

17. A tyre comprising:
a tread portion including at least one main groove extending in a tyre circumferential direction and at least one lateral groove connected to the at least one main groove, each of the main groove and the lateral groove having a groove bottom and a pair of groove walls extending from the groove bottom in a tyre radial direction,
the at least one main groove comprising an intersection to which the at least one lateral groove is connected, and one of the groove walls of the at least one main groove or the at least one lateral groove having projections protruding toward the intersection, wherein each of the projections, in a front view of the groove walls, includes an outer projection and an inner projection extending along a single straight line or along a single arc curve without having an inflection point from the groove bottom to a ground contact surface of the tread portion in the tyre radial direction.

\* \* \* \* \*